A. H. PEYCKE.
BRAKE EQUIPMENT.
APPLICATION FILED JUNE 10, 1910.
1,315,402.
Patented Sept. 9, 1919.
2 SHEETS—SHEET 2.
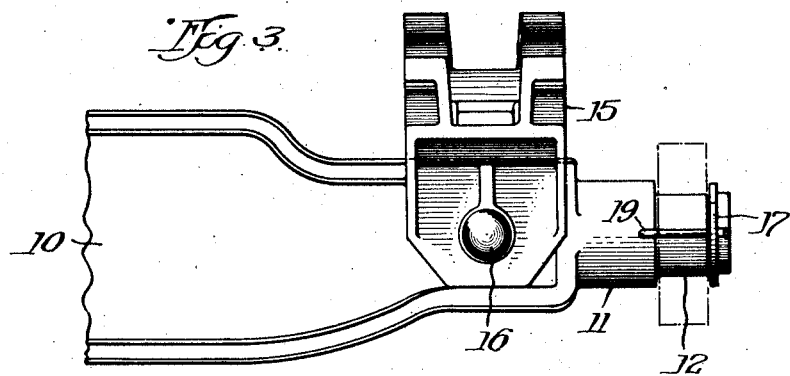
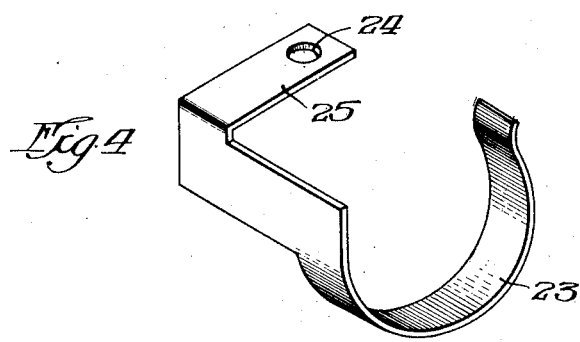
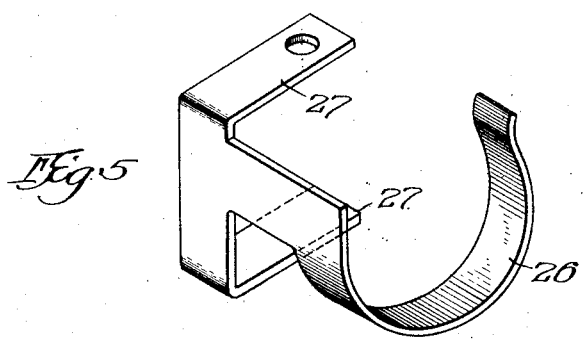
Witnesses:
Inventor
Armand H. Peycke,

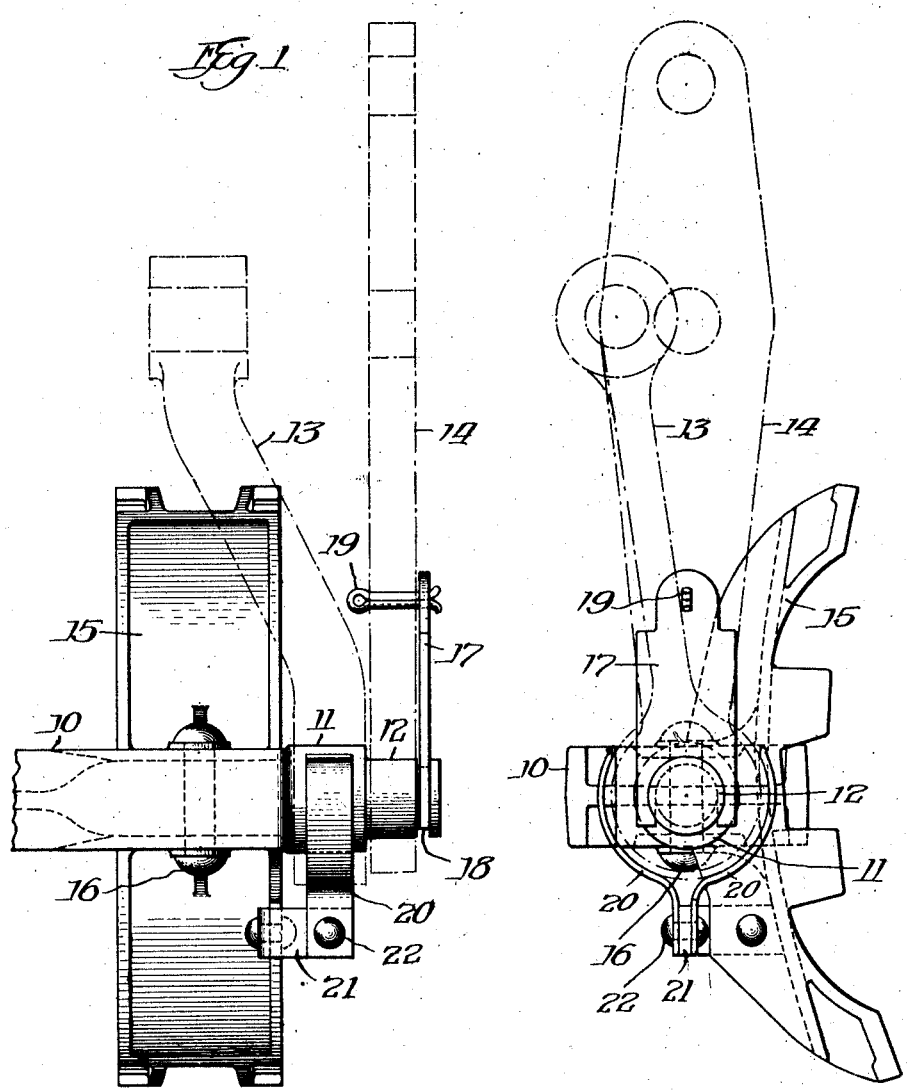

UNITED STATES PATENT OFFICE.

ARMAND H. PEYCKE, OF CHICAGO, ILLINOIS, ASSIGNOR TO AMERICAN STEEL FOUNDRIES, OF CHICAGO, ILLINOIS, A CORPORATION OF NEW JERSEY.

BRAKE EQUIPMENT.

1,315,402.   Specification of Letters Patent.   Patented Sept. 9, 1919.

Application filed June 10, 1918. Serial No. 239,105.

*To all whom it may concern:*

Be it known that I, ARMAND H. PEYCKE, a citizen of the United States, residing at Chicago, in the county of Cook and State of Illinois, have invented certain new and useful Improvements in Brake Equipments, of which the following is a specification.

This invention relates to brake equipments.

One of the objects of this invention is to simplify and improve brake mechanism, and more particularly means for supporting brake beams and heads and their connections with other operating parts.

Another object is to provide a break beam, head, lever and hanger arrangement coöperating in a novel manner to meet the requirements for successful commercial use.

These and other objects are accomplished by means of the arrangement disclosed on the accompanying sheets of drawings, in which—

Figure 1 is a rear elevation of brake mechanism embodying my invention;

Fig. 2 is a side elevation of the same;

Fig. 3 is a plan view of said arrangement; and,

Figs. 4 and 5 are perspective views of modified forms of springs forming part of the brake equipment.

The various novel features of my invention will be apparent from the following description and drawings and will be particularly pointed out in the appended claims.

Referring to the figures of the drawings, it will be noted that I have shown a drop forged brake beam 10, each end of which is provided with a plurality of trunnions 11 and 12 of different diameters. Connected to the inner one of the two trunnions is a brake hanger 13, the upper end of which is offset and connected to any suitable support. The outer trunnion 12 receives a brake lever 14, whereby braking forces may be transmitted through the brake beam 10 and head 15 to the coöperating truck wheel. The brake head 15 is secured to the web of the brake beam by a rivet 16, or by any other suitable means. The trunnion 11 is made larger than the trunnion 12 to withstand harder service due to increased bending stress to which it is subjected. To make the outer trunnion 12 as large as the adjacent trunnion 11 would be a waste of material. Preferably said trunnions are formed integrally with the beam.

In order to prevent the hanger 13 and lever 14 from being accidentally withdrawn from the brake beam trunnions, a flat locking plate 17 is provided, the lower end of which occupies a groove 18 formed in the trunnion 12, said locking plate being connected to the brake lever 14 by a cotter pin 19, or by any other suitable means. It will be noted that the brake lever 14 and the hanger 13 are both located outside of the brake head and between the brake head and truck side frame, the latter of which is not shown.

As shown in Figs. 1 and 2 of the drawings, curved spring plates 20 embrace opposite sides of the lower eye portion of the hanger 13 for frictionally holding the brake beam and brake heads in such a position that the latter retain their position of concentricity with respect to the braking surfaces of the associated truck wheels. These spring plates 20 are secured to a bracket 21 by a rivet 22, or any other suitable means, the bracket in turn being secured to the brake head 15.

In Fig. 4 of the drawings I have shown a different form of spring 23, which, instead of being secured to the brake head, may be secured to the brake beam 10 by use of the same rivet which secures the brake head to the brake beam, said rivet passing through the opening 24 in the arm 25 of the spring which would be associated with the brake beam proper.

The spring 26 shown in Fig. 5 has a plurality of connected arms 27 which embrace opposite sides of the brake beam and are secured to the latter by means of the rivet which secures the brake head to the brake beam. The spring shown in Figs. 4 and 5 perform the same function as the spring shown in Figs. 1 and 2.

It is my intention to cover all modifications of the invention falling within the spirit and scope of the following claims.

I claim:

1. In brake mechanism, the combination of a brake beam having a plurality of trunnions adjacent the same end of the beam, a brake lever connected to one of said trunnions, and a brake hanger connected to the other of said trunnions.

2. In brake mechanism, the combination of a brake beam, a brake head mounted thereon, there being a plurality of trunnions located outside of the brake head, and brake operating and supporting members operatively connected to said trunnions.

3. In brake mechanism, the combination of a brake beam, a brake head mounted thereon, there being a plurality of trunnions located outside of the brake head, a brake lever connected to one of said trunnions, and a brake hanger connected to the other of said trunnions.

4. In brake mechanism, the combination of a brake beam, a brake head secured thereto, there being trunnions formed integrally with said brake beam adjacent said brake head, a brake lever connected to one of said trunnions, and a brake hanger connected to another of said trunnions.

5. In brake mechanism, the combination of a brake beam, a brake head secured thereto, there being trunnions formed integrally with said brake beam adjacent said brake head, a brake lever connected to one of said trunnions, a brake hanger connected to another of said trunnions, and means for retaining said lever and hanger on said trunnions.

6. In brake mechanism, the combination of a brake beam, a brake head carried thereby, there being a plurality of trunnions differing in size and formed integrally with said brake beam, a brake hanger connected to the larger of said trunnions, and a brake lever connected to the smaller of said trunnions.

7. In brake mechanism, the combination of a brake beam, a brake head carried thereby, there being a trunnion on said brake beam to one side of the brake head, a brake hanger connected to said trunnion, and means engaging a portion of said hanger for frictionally retaining the hanger in adjusted position with respect to the brake head.

8. In brake mechanism, the combination of a brake beam, a head mounted thereon, there being a trunnion on said beam to one side of said head, a hanger mounted on said trunnion, and a resilient member carried by said brake head and engaging a portion of said hanger for frictionally holding the parts in adjusted position.

Signed at Chicago, Illinois, this 28th day of May, 1918.

ARMAND H. PEYCKE.

Copies of this patent may be obtained for five cents each, by addressing the "Commissioner of Patents, Washington, D. C."